United States Patent Office 2,843,564
Patented July 15, 1958

2,843,564

CONDENSATION PRODUCTS

Heinz Schultheis, Leverkusen-Bayerwerk, and Detlef Delfs, Opladen, Germany, assignors to Farbenfabriken Bayer Aktiengesellschaft, Leverkusen, Germany, a corporation of Germany No Drawing. Application December 7, 1954
Serial No. 473,748

16 Claims. (Cl. 260—49)

The present invention relates to new water-soluble condensation products having tanning action and to a process of producing same.

In our copending application Serial No. 360,614, filed June 9, 1953, we have described a process of producing tanning agents by simultaneously introducing an o-chloro-substituted phenol and an aldehyde suitable for linkage of nuclei, preferably formaldehyde, into an aromatic sulfonic acid (mono- or disulfonic acids or aromatic ring systems containing at least two condensed aromatic nuclei, or a mixture of these mono- and disulfonic acids) at temperatures above the melting point of the aromatic sulfonic acid.

It is an object of the present invention to provide new tanning agents having improved dispersing properties.

Another object of the present invention is to provide a process of producing condensation products which are useful as tanning agents.

Further objects will become apparent as the following description proceeds.

In accordance with the present invention we have found that tanning agents having improved dispersing properties can be obtained by condensing a mono- or disulfonic acid of aromatic ring systems containing at least two condensed aromatic nuclei, with lower aldehydes, especially formaldehyde, or substances releasing formaldehyde, and o-chloro-substituted phenols having at least one free o- or p-position, for instance o-chlorophenol and 6-chloro-m-cresol, and other substituted phenols having an essentially lower reactivity than unsubstituted phenol under the reaction conditions. Such phenols having a reduced reactivity correspond to the formula

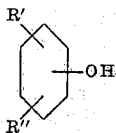

wherein R' stands for alkyl, halogen, nitro, and carbalkoxy, R" stands for hydrogen and one of the groups standing for R', or R'+R" are a benzene nucleus. Examples of such phenols having a reduced reactivity are p-chlorophenol, nitrophenols, 3-chloro-4-nitrophenol, salicylic acid methyl esters, β-naphthol, 1,3-xylenol-4, 1,4-xylenol-5, and 1,2-xylenol-3. Examples of suitable mono- and disulfonic acids of aromatic ring systems containing at least two condensed aromatic nuclei are β-naphthalene sulfonic acid, α-methylnaphthalene sulfonic acid, anthracene disulfonic acid, phenanthrene disulfonic acid and mixtures of these acids. In most cases the sulfonation mixture is used in the form as it is obtained from the hydrocarbon and the sulfonating agents, for instance sulfuric acid monohydrate and concentrated sulfuric acid. When using for instance anthracene disulfonic acids, small quantities of water may be added before or during the reaction to keep the reaction mixture stirrable at the desired temperature.

The leather obtained by treating animal hides with the new condensation products shows improved properties and varies in color and character from leather resulting from hides treated with the products described in our above-said copending application Serial No. 360,614.

As a rule the abovesaid other substituted phenols of low reactivity or mixtures of such phenols may be employed according to the invention in quantities from about 0.5 up to about three times the molar amount of the o-chloro-substituted phenol used in the reaction. In general, it is of advantage to apply said other substituted phenols of low reactivity in an amount not in excess of the equimolecular amount of the o-chloro-substituted phenols. The reaction using compounds of higher reactivity, for instance β-naphthol, is preferably carried out with smaller quantities of said other substituted phenols of low reactivity in order to obtain easily water-soluble condensation products.

In practicing the invention, said other substituted phenols of low reactivity are either dissolved in the o-chloro-phenol or in the sulfonation mixture of the polynuclear aromatic hydrocarbons (or in the above-said mono- or disulfonic acid). The type and character of said other substituted phenols of low reactivity govern the course of the reaction: phenols the reactivity of which is only slightly reduced, for instance the above-said xylenols, are mixed with the o-chlorophenol in order to secure the production of the consensation products that are soluble in water. The addition of the mixture of phenols on the one hand and formaldehyde on the other hand is controlled so that either the addition of both products is finished at the same time or that a smaller portion of the aldehyde, say 1–5%, is introduced after the addition of the phenol mixture; the latter method is preferably adopted in the condensation of aromatic sulfonic acids with larger quantities of aldehyde. Phenols the reactivity of which is reduced to a larger extent, for instance p-nitrophenol, may be added to the sulfonation mixture before the reaction starts. In this case, the addition of o-chlorophenol on the one hand and formaldehyde on the other hand is controlled so that either the addition of both products is finished at the same time or that a smaller portion of the aldehyde, say 1–5%, is introduced after the addition of o-chlorophenol; the latter method is preferably adopted in the condensation of aromatic sulfonic acids with larger quantities of aldehyde. The other reaction conditions may be equal to those described in our abovesaid copending application Serial No. 360,614, i. e. the condensation is preferably carried out with stirring in an acid medium at elevated temperatures, preferably between 80–130° C.

By this process up to about two mols of the abovesaid phenols per one mol of aromatic acid can be condensed to a highly viscous brown sirup without impairing the stability of the product. The aldehyde is applied in amounts of up to about 2 mols. The sirup is subsequently neutralized in known manner, for instance with aqueous ammonia, and adjusted to a pH of about 2.0–4.0, preferably 2.5–3.5, with acid, for instance formic acid and/or acetic acid.

The new condensation products obtained according to the invention are stable on storage for an indefinite time, compatible with vegetable tannins in every proportion and yield a fully tanned, light leather. Furthermore, they disperse and dissolve the sludge and the phlobaphene of organic tanning solutions. This property is especially inherent in products produced by condensing 0.5–1.5 mols of the abovesaid phenol with 0.75–1.3 mols of formaldehyde and 1 mol of β-naphthalene sulfonic acid.

The new condensation products can be solidified without impairing their tanning and dispersing properties, by conventional drying methods, for instance by evaporating in vacuo, more preferably by roller drying or spray drying. The drying is preferably carried out after neutralizing the condensation products, for instance with ammonia so that, after adjusting the pH with solid, acid reacting substances, for instance sodium bisulfate, oxalic acid and nitric acid or mixtures thereof, pulverulent tanning agents are obtained, which are non-hygroscopic and readily yield clear solutions with cold water. These solutions have the same properties as the sirupy products. They are standardized by addition of liquid acids, for instance formic acid, acetic acid and hydrochloric acid, to the solutions of the neutral tanning powder.

Instead of mixtures of pure phenols, also mixtures obtained in the large scale production by phenol-chlorination processes may be employed, for instance a crude mixture containing about 53% of o-chlorobenzene and 43% of p-chloro benzene. A low content of residual free phenol or other compounds which readily condense with formaldehyde does not interfere with the reaction if such content does not substantially exceed 5%.

The present invention is further illustrated by the following examples without being restricted thereto.

Example 1

130 grams of naphthalene are sulfonated with 130 grams of sulfuric acid monohydrate at 160° C. 87.5 grams of formaldehyde (30%) and a crude mixture containing 53% of o-chlorophenol and 43% of p-chlorophenol (the rest being phenol and traces of dichlorophenols) are simultaneously dropped into the melt while stirring at 95° C. within one hour from two dropping funnels, preferably at such a rate that the last 4–5 grams of formaldehyde are added when the feeding of the chlorophenol mixture is finished. The mixture is stirred at this temperature for another hour, allowed to cool to about 85° C. and neutralized with ammonia water (25%). After adjusting a suitable pH value by addition of acetic or formic acid a sirup is obtained which yields a clear solution in water and has a percentage of pure tannin in dry substance of about 54% and a percentage figure of about 87. When used as tanning agent, a light leather of good body is obtained; the dispersing and sludge dissolving action is excellent.

A tanning agent having substantially the same analytical values is obtainable from a chlorophenol mixture containing 75% of p- and 25% of o-chlorophenol. This tanning agent yields leather of increased firmness and solidity.

Example 2

Naphthalene is sulfonated as described in Example 1 and 87.5 grams of formaldehyde (30%) as well as a mixture of 45 grams of o-chlorophenol and 18 grams of 1.3-xylenol-4 are simultaneously added from 2 dropping funnels at 95–100° C. within about one hour. Neutralizing and standardizing of the pH value are effected as described in Example 1. A pourable sirup which yields a clear brown colored solution in water is obtained, which has a concentration of about 58.7% and a percentage of pure tannin in dry substance of 46%; when used as tanning agent, it yields a brownish colored leather.

Example 3

The reaction described in Example 2 is repeated but 21 grams of p-nitrophenol are employed instead of the xylenol. The resulting product which yields a clear yellow-brown colored solution in water has the acid number 150/100, a concentration of 59.8%, a percentage of pure tannin in dry substance of 52.3% and a percentage figure of 87.4%. A condensation product of substantially equal analytical values (concentration= 61.3%, percentage of pure tannin in dry substance= 53.9%, percentage figure=88) is obtained if the p-nitrophenol is not dissolved in o-chlorophenol but added to the melt of naphthalene and sulfonic acid monohydrate. Both products show excellent dispersing properties and, when used as tanning agent, give light, slightly yellowish colored leather of good properties. For instance in combination with minosa-quebracho-mixture (1:1) in amounts of 25% (calculated on pre tannin), they favourably influence the leather color which is shifted from a dark red brown to an attractive light cream brown.

Example 4

90 grams of formaldehyde (30%) and a mixture of 51.5 grams of o-chlorophenol and 30.5 grams of salicyclic acid methyl ester are simultaneously dropped with good stirring into a melt of naphthalene and sulfuric acid monohydrate prepared as described in Example 1. After adjusting the neutralized condensation mixture with formic acid (or acetic acid) a tanning sirup is obtained, which has a percentage figure of about 79 and yields a well filled, almost white leather.

Example 5

35 grams of dry chloro-4-nitrophenol are added to the melt of naphthalene and sulfuric acid monohydrate prepared as described in Example 1, and 87.5 grams of formaldehyde (30%) and 38.5 grams of o-chlorophenol are simultaneously dropped into the melt with stirring at 95–100° C. The sirup worked up in the usual manner shows the following analytical values: concentration=58.4%, percentage of pure tannin in dry substance=49.4%, percentage figure=84.6%. The sirup yields a light yellow-brown colored leather.

Example 6

The reaction of Example 2 is repeated but the condensation is carried out with a solution of 14.5 grams of β-naphthol in 41.5 grams of o-chlorophenol. After neutralizing and standardizing the condensation mixture a product having a percentage figure of 76 results. The product gives a clear, brown colored solution in water and, when used as tanning agent, a fine light brown colored leather.

We claim:

1. As new products, those prepared by condensing, in a strongly acid medium until the resulting products are water-soluble, about 1 mol of 2-naphthalene sulfonic acid, about 0.5–1.5 mols of a crude mixture containing o-chlorophenol and p-chlorophenol and about 0.75–1.3 mols of formaldehyde.

2. The process of preparing water-soluble condensation products suitable for tanning which comprises simultaneously introducing 0.4–2 mols of formaldehyde and 0.1–2 mols of a mixture containing an o-chlorophenol in which at least one of the ring positions o- and p- is a free position and a member selected from the group consisting of p-chlorophenol, nitrophenols, 3-chloro-4-nitrophenol, salicylic acid methyl ester, β-naphthol, 1,3-xylenol-4, 1,4-xylenol-5, and 1,2-xylenol-3, into 1 mol of sulfonic acids of aromatic hydrocarbons containing at least two condensed nuclei, said sulfonic acid being selected from the group consisting of monosulfonic acids, disulfonic acids and mixtures thereof in a strongly acid medium.

3. The process of preparing water-soluble condensation products suitable for tanning which comprises simultaneously introducing 0.4–2 mols of formaldehyde and 0.1–2 mols of a mixture containing an o-chlorophenol in which at least one of the ring positions o- and p- is a free position, and a member selected from the group consisting of p-chlorophenol, nitrophenols, 3-chloro-4-nitrophenol, salicylic acid methyl ester, β-naphthol, 1,3-xylenol-4, 1,4-xylenol-5, and 1,2-xylenol-3, into 1 mol of sulfonic acids of aromatic hydrocarbons containing at least two condensed nuclei, said sulfonic acids being selected from the group consisting of monosulfonic acids, disulfonic acids and mixtures thereof in a strongly acid medium at temperatures of about 80–130° C.

4. The process of preparing water-soluble condensation products suitable for tanning as claimed in claim 2 wherein the aldehyde and said mixture of phenols are introduced separately.

5. The process of preparing water-soluble condensation products suitable for tanning as claimed in claim 2 wherein the aldehyde and o-chlorophenol are introduced separately into the mixture of the phenol other than the o-chlorophenol and the sulfonic acids.

6. The process of preparing water-soluble condensation products suitable for tanning as claimed in claim 2 wherein an amount of about 1–5 percent of the aldehyde is added to the reaction mixture after introducing said mixture of phenols.

7. As new products the water-soluble condensation products from 1 mol of sulfonic acids of aromatic hydrocarbons containing at least two condensed nuclei, said sulfonic acids being selected from the group consisting of monosulfonic acids, disulfonic acids and mixtures thereof, 0.2–3 mol of a saturated lower aliphatic aldehyde and 0.1–1.5 mol of an o-chlorophenol in which at least one of the ring positions o- and p- is a free position, and 0.1–1 mol of another substituted phenol selected from the group consisting of p-chlorophenol, nitrophenols, 3-chloro-4-nitrophenol, salicyclic acid methyl ester, β-naphthol, 1,3-xylenol-4, 1,4-xylenol-5, and 1,2-xylenol-3, said condensation products having been prepared by conducting the condensation in a strongly acid medium until the resulting products are water-soluble.

8. As new products the water-soluble condensation products from 1 mol of sulfonic acids of aromatic hydrocarbons, said sulfonic acids being selected from the group consisting of naphthalene monosulfonic acids, naphthalene disulfonic acids and mixtures thereof, 0.2–3 mol of a saturated lower aliphatic aldehyde and 0.1–1.5 mol of an o-chlorophenol in which at least one of the ring positions o- and p- is a free position, and 0.1–1 mol of another substituted phenol selected from the group consisting of p-chlorophenol, nitrophenols, 3-chloro-4-nitrophenol, salicylic acid methyl ester, β-naphthol, 1,3-xylenol-4, 1,4-xylenol-5, and 1,2-xylenol-3, said condensation products having been prepared by conducting the condensation in a strongly acid medium until the resulting products are water-soluble.

9. As new products the water-soluble condensation products from 1 mol of sulfonic acids of aromatic hydrocarbons, said sulfonic acids being selected from the group consisting of naphthalene monosulfonic acids, naphthalene disulfonic acids and mixtures thereof, 0.2–3 mol of formaldehyde and 0.1–1.5 mol of an o-chlorophenol in which at least one of the ring positions o- and p- is a free position, and 0.1–1 mol of another substituted phenol selected from the group consisting of p-chlorophenol, nitrophenols, 3-chloro-4-nitrophenol, salicylic acid methyl ester, β-naphthol, 1,3-xylenol-4, 1,4-xylenol-5, and 1,2-xylenol-3, said condensation products having been prepared by conducting the condensation in a strongly acid medium until the resulting products are water-soluble.

10. As new products the water-soluble condensation products from 1 mol of sulfonic acids of aromatic hydrocarbons, said sulfonic acids being selected from the group consisting of naphthalene monosulfonic acids, naphthalene disulfonic acids and mixtures thereof, 0.2–3 mol of formaldehyde and 0.1–1.5 mol of o-chlorophenol in which at least one of the ring positions o- and p- is a free position, and 0.1–1 mol of another substituted phenol selected from the group consisting of p-chlorophenol, nitrophenols, 3-chloro-4-nitrophenol, salicylic acid methyl ester, β-naphthol, 1,3-xylenol-4, 1,4-xylenol-5, and 1,2-xylenol-3, said condensation products having been prepared by conducting the condensation in a strongly acid medium until the resulting products are water-soluble.

11. As new products the water-soluble condensation products from 1 mol of sulfonic acids of aromatic hydrocarbon, said sulfonic acids being selected from the group consisting of naphthalene monosulfonic acids, naphthalene disulfonic acids and mixtures thereof, 0.2–3 mol of formaldehyde and 0.1–1.5 mol of 6-chloro-m-cresol in which at least one of the ring positions o- and p- is a free position, and 0.1–1 mol of another substituted phenol selected from the group consisting of p-chlorophenol, nitrophenols, 3-chloro-4-nitrophenol, salicylic acid methyl ester, β-naphthol, 1,3-xylenol-4, 1,4-xylenol-5, and 1,2-xylenol-3, said condensation products having been prepared by conducting the condensation in a strongly acid medium until the resulting products are water-soluble.

12. The process of preparing water-soluble condensation products suitable for tanning which comprises reacting sulfonic acids of an aromatic hydrocarbon containing at least two condensed nuclei, said sulfonic acids being selected from the group consisting of monosulfonic acids, disulfonic acids, and mixtures thereof, with a saturated lower aliphatic aldehyde and an o-chlorophenol in which at least one of the ring positions o- and p- is a free position, and another substituted phenol selected from the group consisting of p-chloro-phenol, nitrophenols, 3-chloro-4-nitrophenol, salicylic acid methyl ester, β-naphthol, 1,3-xylenol-4, 1,4-xylenol-5, and 1,2-xylenol-3, in a strongly acid medium at least until the resulting product is water-soluble.

13. The process of preparing water-soluble condensation products suitable for tanning which comprises reacting sulfonic acids of an aromatic hydrocarbon, said sulfonic acids being selected from the group consisting of naphthalene monosulfonic acids, naphthalene disulfonic acids and mixtures thereof, with a saturated lower aliphatic aldehyde and an o-chlorophenol having at least one free o- or p- position, and another substituted phenol selected from the group consisting of p-chlorophenol, nitrophenols, 3-chloro-4-nitrophenol, salicylic acid methyl ester, β-naphthol, 1,3-xylenol-4, 1,4-xylenol-5, and 1,2-xylenol-3, in a strongly acid medium at least until the resulting product is water-soluble.

14. The process of preparing water-soluble condensation products suitable for tanning which comprises reacting sulfonic acids of an aromatic hydrocarbon, said sulfonic acids being selected from the group consisting of naphthalene monosulfonic acids, naphthalene disulfonic acids and mixtures thereof, with formaldehyde and an o-chlorophenol in which at least one of the ring positions o- and p- is a free position, and another substituted phenol selected from the group consisting of p-chlorophenol, nitrophenols, 3-chloro-4-nitrophenol, salicylic acid methyl ester, β-naphthol, 1,3-xylenol-4, 1,4-xylenol-5, and 1,2-xylenol-3, in a strongly acid medium at least until the resulting product is water-soluble.

15. The process of preparing water-soluble condensation products suitable for tanning which comprises reacting sulfonic acids of an aromatic hydrocarbon, said sulfonic acids being selected from the group consisting of naphthalene monosulfonic acids, naphthalene disulfonic acids and mixtures thereof, with formaldehyde and o-chlorophenol in which at least one of the ring positions o- and p- is a free position, and another substituted phenol selected from the group consisting of p-chlorophenol, nitrophenols, 3-chloro-4-nitrophenol, salicylic acid methyl ester, β-naphthol, 1,3-xylenol-4, 1,4-xylenol-5, and 1,2-xylenol-3, in a strongly acid medium at least until the resulting product is water-soluble.

16. The process of preparing water-soluble condensation products suitable for tanning which comprises reacting sulfonic acids of an aromatic hydrocarbon, said sulfonic acids being selected from the group consisting of naphthalene monosulfonic acids, naphthalene disulfonic acids and mixtures thereof, with formaldehyde and 6-chloro-m-cresol in which at least one of the ring positions o- and p- is a free position, and another substituted phenol selected from the group consisting of p-chlorophenol, nitrophenols, 3-chloro-4-nitrophenol, salicylic acid methyl ester, β-naphthol, 1,3-xylenol-4, 1,4-xylenol-5, and 1,2-xylenol-3, in a strongly acid medium at least until the resulting product is water-soluble.

References Cited in the file of this patent

UNITED STATES PATENTS

| | | |
|---|---|---|
| 2,204,512 | Russell et al. | June 11, 1940 |
| 2,597,171 | Otto et al. | May 20, 1952 |

FOREIGN PATENTS

| | | |
|---|---|---|
| 464,766 | Great Britain | Apr. 19, 1937 |
| 695,374 | Germany | Aug. 23, 1940 |
| 896,174 | France | Apr. 24, 1944 |